United States Patent [19]

Ando et al.

[11] Patent Number: 5,057,352

[45] Date of Patent: Oct. 15, 1991

[54] MAGNETIC RECORDING MEDIUM

[75] Inventors: Yasuo Ando; Takuo Nishikawa, both of Hino, Japan

[73] Assignee: Konica Corporation, Tokyo, Japan

[21] Appl. No.: 536,535

[22] Filed: Jun. 12, 1990

[30] Foreign Application Priority Data

Jun. 15, 1989 [JP] Japan .................................. 1-152506

[51] Int. Cl.$^5$ .............................................. G11B 23/00
[52] U.S. Cl. .................................... 428/141; 428/694; 428/900
[58] Field of Search ........................ 428/141, 694, 900

[56] References Cited

U.S. PATENT DOCUMENTS

| | | | |
|---|---|---|---|
| 4,803,132 | 2/1989 | Kishimoto et al. | 428/141 |
| 4,810,555 | 3/1989 | Shimozawa et al. | 428/141 |
| 4,812,351 | 3/1989 | Okita et al. | 428/141 |

*Primary Examiner*—Paul J. Thibodeau
*Attorney, Agent, or Firm*—Jordan B. Bierman

[57] ABSTRACT

A magnetic recording medium is disclosed. The surface of the magnetic layer has a Ns/Ns(t) ratio of 0.10 to 0.35, wherein the Ns is a number of spikes protruding from an average line of a surface roughness cross section curve by not less than 0.01 $\mu$m and the Ns(t) is a total number of spikes protruding from the average line. The medium is improved in electromagnetic characteristics, contamination of magnetic head and rubbing noise.

5 Claims, No Drawings

MAGNETIC RECORDING MEDIUM

FIELD OF THE INVENTION

The present invention relates to a magnetic recording medium, specifically to the surface quality of a magnetic layer.

BACKGROUND OF THE INVENTION

In the field of information processing, magnetic recording mediums enjoy a brisk demand due to their effectiveness as the element for recording and reproduction. At the same time, there have been increasing demands for improved electromagnetic conversion characteristics, a larger recording capacity and a higher density, improved running properties, durability and storageability, better cost performance, as well as simplified manufacturing procedures. Efforts are being made in the art to satisfy these requirements.

It is generally known that electromagnetic conversion properties can be improved by reducing the thickness of a magnetic layer, increasing the packing ratio of magnetic powder and making the surface of a component layer provided on the side of a magnetic layer smooth. For these purposes, selection of magnetic powders and fillers with suitable particle sizes, as well as calendering treatment are required to be performed.

However, excessive surface smoothness results in an increased friction coefficient and poor running properties. On the other hand, too much roughness causes a spacing loss, powder drop-off, and wear of a magnetic head. From the above, it is readily understood that the surface quality of a magnetic layer is a matter requiring a thorough examination.

It should be noted that the surface of a non-magnetic support provided in a conventional magnetic recording medium (hereinafter, simply referred to as a "magnetic tape") is rough enough to give the surface of a magnetic tape such unevenness as will affect adversely electromagnetic conversion characteristics. Such surface roughness, coupled with the single-layer structure employed in a lot of magnetic layers, produces various unpreferable noises, which cannot be avoided by the provision of a subbing layer.

Taking the case of a video tape, its electromagnetic conversion characteristics, in particular, chroma S/N and lumi S/N, are greatly influenced by its surface quality. Excessive smoothness results in poor running properties, increased rubbing noises, irregular electromagnetic conversion and cinching due to contamination of a magnetic head.

In a multi-layered magnetic layer which is advantageous for both high and low frequency recordings, to minimize the negative effects of the surface roughness of a support, attempts were made to increase the thickness of an upper magnetic layer or to increase the smoothness of a lower magnetic layer. The former method, however, impairs low frequency characteristics imparted to the lower magnetic layer. In the latter method, excessive smoothness of the lower magnetic layer results in increased rubbing noises.

Noises, one of factors constituting electromagnetic conversion characteristics, are generated by problems in the structure and condition of a magnetic tape. The example of noises include drop-out due to defective structure of a magnetic tape or accumulation of dust; electric discharge noises or rubbing noises generated by an electric discharge in the proximity of a magnetic head; and other noises of unknown origin. Among these noises, rubbing noises, reduction of which is not an easy task, have their sources in a magnetic head. A magnetic head, in turn, is greatly affected by the tribology of a magnetic tape.

Factors contributing to an uneven magnetic layer surface include the roughness of the surface of a support, agglomeration of magnetic particles, the in-plane density distribution, and ununiform coating. These factors, coupled with such factor as surface friction coefficient, cause such problems as poor contact between a head and a tape; vibration of a tape due to its expansion and contraction in the longitudinal direction, which is ascribable to poor running performance; and flattering. These problems ultimately lead to generation of rubbing noises.

To avoid them, it is important to make the properties of a magnetic tape, such as electromagnetic conversion properties and running properties, well-balanced.

However, with the recent increase of recording density, it has come to more difficult than ever to attain such balance. Under such circumstances, it is not proper to depend on conventional methods in evaluating the properties of a magnetic tape.

For instance, the center line average roughness (Ra), which has been the most common index for surface roughness, is not suitable for the evaluation of spacing loss. Ra is the average value of definite integrals of the absolute values of the roughness curve f(X) within a reference length (1), which is defined by the formula:

$$Ra = \frac{1}{l} \int_0^l |f(x)| dx$$

Ra takes into account concave portions which do not essentially affect the running properties of a tape. In this respect, measurement of Ra for the evaluation of spacing loss may be misleading. Instead of Ra, Rmax, the arithmetic average of heights of projections within a reference length, should be employed for the evaluation of spacing loss. In Rmax, a height includes the length of the lower half of a projection, which is seemed to exert no influence on tape characteristics. According to the above definitions, Ra and Rmax have totally different physical meanings.

The Japanese Patent Publication Open to Public Inspection Nos. 168124/1986 and 143523/1981 describe the influence of Ra and Rmax on electromagnetic conversion characteristics and running properties.

SUMMARY OF THE INVENTION

The object of the invention is to provide a magnetic recording medium, which is improved in electromagnetic conversion characteristics and free from rubbing noises and head contamination.

A magnetic recording medium of the present invention has a non-magnetic support and provided thereon a magnetic layer containing magnetic powder and a binder, wherein the surface of said magnetic layer has a Ns/Ns(t) ratio of 0.10 to 0.35, provided that said Ns is the number of spikes protruding from the average line of a surface roughness cross section curve by not less than 0.01 μm and said Ns(t) is the total number of spikes protruding from said average line.

An explanation will be made on the method for determining Ns, Ns(t) (each representing, as a number of spikes, the surface roughness of magnetic layer that according to the invention directly affects the magnetic conversion efficiency) and Ns/Ns(t) ratio (hereinafter referred to as γs).

In the measurement, use is made of a Talystep roughness tester (manufactured by Rank Taylor Hobson).

Method and Conditions of Measurement

Stylus: $2.5 \times 0.1$ μm

Needle pressure: 2 mg

Cut-off filter: 0.3 Hz

Measuring speed: 2.5 μm/sec

Reference length: 0.5 mm

In a roughness curve, projections of not more than 0.005 μm in height are not taken into account.

By the above method and conditions, the number of spikes protruding from the average line of the roughness curve by not less than 0.01 μm (Ns) and the total number of spikes protruding from the average line are obtained, followed by the calculation of a Ns/Ns(t) ratio (γs).

In the present invention, for avoiding rubbing noises and head contamination without impairing electromagnetic conversion characteristics, γs must be in the range of 0.10 to 0.35, preferably 0.15 to 0.30.

It should be noted that γs expresses clearly and concretely the physical meaning of surface roughness.

As stated above, Ra, the center line average surface roughness, taking into account concave portions below the average line, and Rmax, the maximum roughness, taking into account heights which do not affect adversely, have completely different definitions. Taking into consideration these facts, significance of a Rmax/Ra ratio in evaluating electromagnetic conversion characteristics is questionable.

As far as electromagnetic conversion characteristics are concerned, the surface roughness condition expressed by γs and that by a Rmax/Ra ratio convey different physical meanings.

To adjust surface roughness based on γs, attention must be drawn to dispersion of magnetic powder, selection of a suitable binder and plasticity of a coating film.

For the dispersion of magnetic powder, use is made of a kneader with a high shear force or zirconia beads with a high dispersion power to permit sufficient dispersion. The suitable binder is one which is highly dispersive and contains therein an anionic functional group.

In calender treatment, poor dispersion of magnetic powder increases the void volume rate of a coating film, renders its surface excessively smooth, thus making it impossible to obtain desirable values of Ns, Ns(t) and γs.

In calendering, if the plasticity of a coating film is too high, calendering takes effect too much, resulting in loss of spikes. It is important to select a binder of which the glass transition temperature Tg is not too low and, at the same time, not to use a large amount of a dispersant such a phosphates.

Further, suitable surface smoothness of a tape can be obtained by using a non-magnetic support with appropriate surface roughness, performing curing after imparting appropriate surface roughness to a back coating layer, or by using a calender roller with suitable surface roughness.

DETAILED DESCRIPTION OF THE INVENTION

In the present invention, preparation of a magnetic tape can be dependent on conventional techniques.

The examples of a magnetic substance used in the invention include magnetic oxides such as $\gamma\text{-Fe}_2\text{O}_3$, Co-containing $\gamma\text{-Fe}_2\text{O}_3$, Co-coated $\gamma\text{-Fe}_2\text{O}_3$, $\text{Fe}_3\text{O}_4$, Co-containing $\text{Fe}_3\text{O}_4$, Co-coated $\text{Fe}_3\text{O}_4$, and $\text{CrO}_2$; and various ferromagnetic substances such as metallic magnetic powder composed mainly of Fe, Ni and Co, e.g., Fe, Ni, Fe-Ni alloys, Fe-Co alloys, Fe-Ni-P alloys, Fe-Ni-Co alloys, Fe-Mn-Zn alloys, Fe-Ni-Zn alloys, Fe-Co-Ni-Cr alloys, Fe-Co-Ni-P alloys, Co-P alloys and Co-Cr alloys. These metallic substances may contain Si, Cu, Zn, Al, P, Mn, Cr and other elements or their compounds as an additive. Also usable are iron nitride and hexagonal systems of ferrite such as barium ferrite.

As the binder, use can made of conventional binders, but, in respect of the dispersion of magnetic particles and fillers, it is preferable to employ a resin modified by introducing a functional group or an intramolecular salt-forming functional group. In particular, modified vinyl chloride-type resins, modified polyurethane-type resins and modified polyester resins are preferable.

The examples of the functional group include $-SO_3M$, $-OSO_2M$, $-COOM$ and

wherein M represents a hydrogen atom, lithium or sodium and $M^1$ and $M^2$ each represent a hydrogen atom, lithium, potassium, sodium or an alkyl group. $M^1$ and $M^2$ may be either identical or different.

These functional groups may be prepared by subjecting a resin such as vinyl chloride-type resins, polyester resins and polyurethane resins and a compound containing an anionic functional group and chlorine, such as $\text{Cl-CH}_2\text{CH}_2\text{SO}_3\text{M}$, $\text{Cl-CH}_2\text{CH}_2\text{OSO}_2\text{M}$, $\text{Cl-CH}_2\text{COOM}$, and

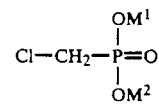

(wherein M, $M^1$ and $M^2$ each have the same meaning as given above) to condensation by a dehydrochlorination reaction.

In the present invention, as the binder for a magnetic layer, use is made of a modified vinyl chloride-type copolymer and/or a modified polyurethane-type copolymer each containing an anionic functional group which is forming an intramolecular salt. From a viewpoint of dispersibility, it is preferred that the vinyl chloride-type copolymer have a polymerization degree ($\overline{P}n$) of in the range of 250 to 500 and contain vinyl chloride units in an amount of 95 to 80 wt%.

When the preceding vinyl chloride-type copolymer is employed as the binder for a magnetic recording medium, the repetitive units of vinyl chloride influence the strength (the Young's modulus) of the medium. That is, if the amount of the vinyl chloride units is too small, the magnetic recording medium cannot have necessary physical properties (the Young's modulus). On the other hand, an excessive amount of such units results in poor solubility in a solvent, as well as a rise of Tg.

By introducing an epoxy group, the thermal stability of vinyl chloride can be improved. Further, such epoxy group reacts with a cross-linking hardener such as isocyanates. By cross-linkage, the binder can have a higher molecular weight. The epoxy group influences linkage with other binder resin such as polyurethane, prevents dehydrochlorination, improves durability such as thermal stability and abrasion resistance. Further, by adjusting the content of the epoxy resin, it is possible to control the Tg and plasticity of the binder resin.

The "polyurethane in which an anionic functional group is forming an intramolecular salt" is prepared by a reaction of a polyisocyanate with a polyol and, if necessary, other copolymer. It is also possible that such polyurethane be a urethane resin containing a free isocyanate group and/or a hydroxyl group, or a urethane prepolymer. A urethane resin containing no such reactive terminal group (e.g., a urethane elastomer) may also be employed.

The amount of a betaine group incorporated into the polyurethane resin is preferably 0.01 to 1.0 mmol/g, more preferably 0.1 to 0.5 mmol/g. If the amount does not reach 0.01 mmol/g, substantial effect on the dispersibility of the ferromagnetic power is not attained. If the amount of this polar group exceeds 1.0 mmol/g, intermolecular or intramolecular agglomeration tends to occur, exerting negative influence on dispersibility. In addition, such excessive amount of a betaine group makes the polyurethane resin insoluble in ordinary solvents.

The number average molecular weight of the polyurethane resin is preferably 5,000 to 100,000, more preferably 10,000 to 40,000. When the number average molecular weight is below 1,000, the film forming property of the resin is insufficient. A molecular weight exceeding 100,000 tends to cause various problems in such processes as the preparation of a coating material, mixing, transportation and coating.

The durability of the component layers of a magnetic tape, including a magnetic layer, can be improved by the blending of the preceding vinyl chloride-type resin and polyurethane resin. However, when the molecular weight of the polyurethane is not less than 60,000, dispersibility is lowered as the particle size of magnetic powder decreases. The use of a polyurethane resin with a molecular weight of not more than 60,000 not only improves dispersibility but also makes a coating material less viscous.

To improve dispersibility, the weight ratio of the vinyl chloride resin to all binders including the preceding polyurethane resin is required to be not less than 30%. In respect of the durability and physical properties of a magnetic coating film, the preceding weight ratio is preferably in the range of 30 to 80%. In particular, when the preceding vinyl chloride resin is blended with a polyurethane resin with a molecular weight of not more than 60,000, the PU (the polyurethane type resin)/VCl (the vinyl chloride type resin) weight ratio is preferably in the range of 80/20 to 20/80, more preferably 50/50 to 30/70. As the polyurethane resin with a molecular weight of not more than 60,000, use can be made of conventional polyurethane resins such as polyester polyurethane, polycarbonate polyurethane, polylactone polyurethane and polyether polyurethane; the use of such materials are not compulsory.

By blending the vinyl chloride resin with a polyurethane resin having a molecular weight of not more than 60,000, the cross linking density of a binder system and the Young's modulus of a magnetic recording medium can be improved.

In the present invention, if need arises, conventional unmodified vinyl chloride resins, polyurethane resins or polyester resins may be used in the form of a mixture with the above resins. Further, it is also possible to use in combination with the preceding binder resins cellulose-type resins, phenoxy resins, thermoplastic resins, thermosetting resins, reactive resins, electron beam irradiation setting resins, and the like.

By employing nitrocellulose with its molecular weight in terms of falling ball viscosity adjusted to $\frac{1}{8}$ to $\frac{1}{4}$ second, dispersiveness, heat resistance, the Young's modulus and resistance to blocking can be improved. The use of such nitrocellulose minimizes friction coefficient, effectively prevents interlayer adhesion, and greatly improves the running stability of a magnetic tape under high temperatures and humidities.

From a viewpoint of productivity, a coating material containing nitrocellulose is more advantageous than that containing vinyl chloride. Such nitrocellulose-containing coating material is very stable and permits prompt dispersion of a filler, while preventing its re-agglomeration.

In the present invention, polyisocyanates may be added to the above binder resins as the hardener.

The examples of usable polyisocyanates include trilene diisocyanate (TDI) and adducts of these isocyanates with active hydrogen compounds. Of them, preferred are those with a molecular weight of 100 to 3,000.

The examples of aliphatic isocyanates include hexamethylene diisocyanate (HMDI) and adducts of these isocyanates with active hydrogen compounds. Of them, preferred are those with a molecular weight of 100 to 3,000. Among the aliphatic isocyanates, non-alicyclic isocyanates and adducts of these isocyanates with active hydrogen compounds are preferable.

The weight ratio of the preceding polyisocyanate to the binder is preferably 1/20 to 7/10, more preferably 1/10 to 1/2.

A magnetic coating material used to form the preceding magnetic layer may contain additives such as a filler and a lubricant, if necessary.

As the filler, besides Carbon Black, organic or inorganic powder may be used either singly or in mixture.

The preferable organic powder includes acryl styrene-type resins, benzoguanamine-type resins, melamine-type resins and phthalocyanine-type pigments. Also usable are polyolefinic resin powder, polyester resin powder, polyamide resin powder, polyimide resin powder and polyethylene fluoride resin powder and other organic powder. The examples of the inorganic powder include silicon oxide, titanium oxide, aluminum oxide, calcium carbonate, barium sulfate, zinc oxide, tin oxide, aluminum oxide, chromium oxide, silicon carbonate, calcium carbonate, $\alpha$-$Fe_2O_3$, talc, kaolin, calcium sulfite, boron nitride, zinc fluoride and molybdenum dioxide.

The examples of the lubricant include silicone oil (may be silicone oil modified with a carboxylic acid or an ester), graphite, fluorinated carbon, molybdenum disulfide, tungsten disulfide, fatty acid amides, $\alpha$-olefin oxides. They may be employed either alone or in combination.

A dispersant may be contained in the magnetic layer as long as it will not impair the effects of the invention. The examples of usable dispersants include lecithin, phosphates, amine compounds, alkyl sulfates, fatty acid amides, higher alcohols, polyethylene oxide, sulfosuccinic acid, sulfosuccinates, known surfactants and their salts. Also usable are salts of polymer dispersants with anionic organic group (e.g., -COOH, -PO$_3$H). These dispersants may be used singly or in combination.

The examples of a solvent formulated in a coating material or a diluent used in applying the coating material include ketones such as acetone, methyl ethyl ketone, methyl isobutyl ketone and cyclohexanone; alcohols such as methanol, ethanol, propanol and butanol; esters such as methyl acetate, ethyl acetate, butyl acetate, ethyl lactate and ethylene glycol monoacetate; ethers such as glycol dimethyl ether, glycol monoethyl ether, dioxane and tetrahydrofuran; aromatic hydrocarbons such as benzene, toluene and xylene; and halogenated hydrocarbons such as methylene chloride, ethylene chloride, carbon tetrachloride, chloroform and dichlorobenzene.

The examples of materials for the support include polyesters such as polyethylene terephthalate and polyethylene-2,6-naphthalate; polyolefins such as polypropylene; cellulose derivatives such as cellulose triacetate and cellulose diacetate; and plastics such as polyamide and polycarbonate. Also usable are metals such as Cu, Al and Zn and ceramics such as glass, boron nitride and carbide.

The thickness of the support is varied according to the shape of a magnetic recording medium, but normally about 3 to 100 μm, preferably 5 to 50 μm, in the case of a magnetic film or a sheet, and 30 μm to 10 mm in the case of a magnetic disc or card. A cylindrical support is employed for a magnetic drum, wherein the detailed configuration is determined depending on the recorder being used.

An intermediate layer may be formed between the support and the magnetic layer to improve adhesion.

In forming a magnetic layer on the support, employable are extrusion simultaneous coating, extrusion one-by-one coating, the combination of reverse-roll coating and extrusion coating, and the combination of gravure-roll coating and extrusion coating in the case of wet-on-wet method.

It is also possible to use in combination air doctor coating, blade coating, air knife coating, squeeze coating, dip coating, transfer roll coating, kiss coating, cast coating and spray coating.

In the case of the wet-on-dry method or the single-layer coating, any combination of the preceding coating manners may be possible.

EXAMPLES

The present invention will be described in more detail in accordance with the following Examples. Examples 1 to 6 and Comparative Examples 1 to 3

Magnetic tape samples were prepared by using the following ingredients.

| Ingredients | Parts by weight |
|---|---|
| Co-coated-γ-Fe$_2$O$_3$ | 150 |
| Copolymer of sulfo-modified vinyl chloride/vinyl acetate/vinyl alcohol | 20 |
| Thermoplastic polyurethane resin | 10 |
| α-Al$_2$O$_3$ | 10 |
| Carbon Black | 10 |
| Myristic acid | 2 |
| Butyl stearate | 1 |
| Cyclohexanone | 200 |
| Methyl ethyl ketone | 100 |
| Toluene | 100 |

| Ingredients | Parts by weight |
|---|---|
| Polyisocyanate | 10 |

Polyisocyanate 10

The above ingredients were mixed with kneading, dispersed, followed by the addition of a hardener, thereby to obtain a coating material. The coating material was applied on a 14 μm-thick polyethylene terephthalate support by means of a reverse-roll coater to have a dry thickness of 4.0 μm. The film was then subjected to calendering according to calendering conditions shown in Table 1. As a result, video tape samples differing in surface roughness were obtained.

The properties of each sample were evaluated, and the results are shown in Table 2.

In Example 6, as the thermoplastic polyurethane resin, use was made of a polyurethane resin in which an anionic functional group -SO$_3$M is forming an intramolecular salt.

TABLE 1

| | Calendering conditions | | |
|---|---|---|---|
| | Conditions | | |
| Sample | Temperature (°C.) | Pressure (kg/cm) | Processing speed (m/min) |
| Example | | | |
| 1 | 60 | 100 | 50 |
| 2 | 60 | 200 | 50 |
| 3 | 60 | 300 | 50 |
| 4 | 70 | 300 | 50 |
| 5 | 70 | 300 | 20 |
| 6 | 70 | 300 | 50 |
| Comparative Example (1) | 50 | 100 | 50 |
| Comparative Example (2) | 50 | 300 | 50 |
| Comparative Example (3) | 80 | 300 | 50 |

TABLE 2

| | Properties | | | |
|---|---|---|---|---|
| Sample | γs | S/N ratio | Rubbing noise (dB) | Variation of output level (dB) |
| Example | | | | |
| 1 | 0.11 | 2.9 | 2.5 | −1.0 |
| 2 | 0.16 | 2.8 | 2.0 | −0.5 |
| 3 | 0.22 | 2.8 | 1.9 | −0.3 |
| 4 | 0.29 | 2.6 | 1.8 | 0.0 |
| 5 | 0.34 | 2.5 | 1.7 | 0.0 |
| 6 | 0.34 | 2.7 | 1.7 | 0.0 |
| Comparative Example | | | | |
| (1) | 0.05 | 3.0 | 5.0 | −3.0 |
| (2) | 0.09 | 2.9 | 3.5 | −2.5 |
| (3) | 0.36 | 1.5 | 1.7 | 0.0 |

Method of Evaluating Properties

[Chroma S/N]

Measured by using a color video noise meter (Model: 925 D/1, produced by Shibasoku Co.).

[Rubbing noise]

(i) Reproduction was performed without running a tape, and a system noise was measured by means of a spectrum analyzer. (ii) Each sample tape was subjected to one-minute reproduction 10 times, and a rubbing noise was measured by means of a spectrum analyzer.
(iii) A noise value at the 10th run was readout, using a noise at around 8 MHz as a reference (0 dB).

[Variation of output level]

(1) Before measurement, a magnetic head was cleaned to remove cloudiness.

(2) To an unused sample tape (Sample No. 1), 6 MHz single frequency signals were inputted for 10 minutes at a recording level of +20% above the standard level, followed by reproduction three times. Then, 8 MHz signals were inputted for two minutes at a recording level of +20% above the reference level, followed by reproduction to measure outputs (these values are assumed to be 0 dB).

(3) At ordinary temperature and low humidity (20%), an unused sample tape (Sample No. 2) was run on the SP mode from the beginning to the end, while recording video signals.

(4) 8 MHz single frequency signals were inputted for two minutes on the same recording level as in (2) above, followed by reproduction to measure outputs. The variation from the value obtained in (2) (0 dB) was examined.

Two sample tapes, Sample Nos. 1 and 2, were used for one recording level.

What is claimed is:

1. A magnetic recording medium having a support and provided thereon a magnetic layer containing magnetic powder and a binder, wherein the surface of the magnetic layer has a Ns/Ns(t) ratio of 0.10 to 0.35, provided that the Ns is a number of spikes protruding from an average line of a surface roughness cross section curve by not less than 0.01 $\mu$m and the Ns(t) is a total number of spikes protruding from the average line.

2. A magnetic recording medium according to claim 1, wherein the surface of the magnetic layer has a Ns/Ns(t) ratio of 0.15 to 0.30.

3. A magnetic recording medium according to claim 1, wherein the binder is selected from a group consisting of modified vinyl chloride resin, modified polyurethane resin and modified polyester resin.

4. A magnetic recording medium according to claim 1, wherein the magnetic layer further contains organic or inorganic powder.

5. A magnetic recording medium according to claim 4, wherein the magnetic layer further contains inorganic powder.

* * * * *